April 20, 1954 J. FRASER 2,675,939
CLOSURE DEVICE FOR FLUID SUPPLY CONNECTIONS AND THE LIKE
Filed Feb. 5, 1952

INVENTOR
JOHN FRASER
BY
ATTORNEY

Patented Apr. 20, 1954

2,675,939

UNITED STATES PATENT OFFICE 2,675,939

CLOSURE DEVICE FOR FLUID SUPPLY CONNECTIONS AND THE LIKE

John Fraser, Tolworth, Surbiton, England, assignor to Avery-Hardoll Limited, Tolworth, Surbiton, England Application February 5, 1952, Serial No. 270,070

Claims priority, application Great Britain April 24, 1951

3 Claims. (Cl. 220—40)

This invention relates to closure devices for fluid supply connections and the like, and more especially for valved fluid supply connections such as are used, for example on aircraft and diesel-engined rail vehicles, to receive a re-fuelling hose through which fuel is supplied under high pressure to the fuel tanks of the aircraft or vehicle.

The object of the invention is to provide a closure device which is very easily manipulated, is firmly held when in position, and will resist leakage of fluid under high pressure.

According to the invention, a closure device for the purpose set forth comprises a cap adapted to engage the fluid connection so as to be held positively against axial separation therefrom, a sealing member rotatably mounted within the cap, resilient means urging the cap axially away from the fluid connection, and members on the cap and fluid connection which are interengaged by relative turning of the cap and the fluid connection, the relative turning movement in the engaging direction being limited by stop means and the inter-engaging members being so arranged that the cap is moved outwardly through a small distance by said resilient means just before the stop means come into engagement.

The invention is hereinafter described with reference to the accompanying drawings, in which.

Figure 1:
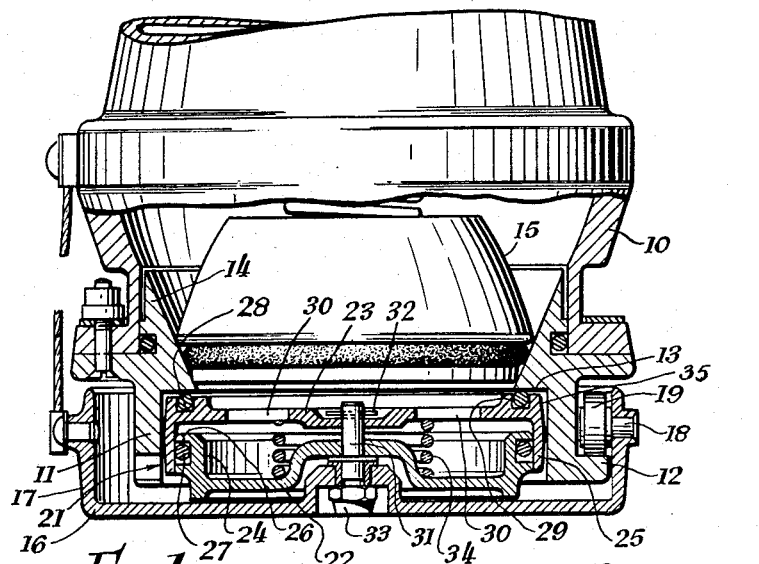
Figure 1 is a sectional elevation of one form of closure device according to the invention, mounted on one half of a more-or-less standard coupling device, such as that disclosed in application Serial No. 214,100 filed March 6, 1951.

Referring to Figure 1 of the drawings, the coupling part 10, which is preferably of a well known type disclosed in and referred to as the first coupling part in application Serial No. 214,100 filed March 6, 1951, has a sleeve-like end 11 formed with three equally circumferentially spaced external radial lugs 12 which, when the coupling parts are connected, engage a flange on the other coupling part. An internal shoulder 13 at the inner end of the sleeve-like portion 11 surrounds the valve seat 14 with which the valve closure member 15 of the coupling part engages.

Figure 3:
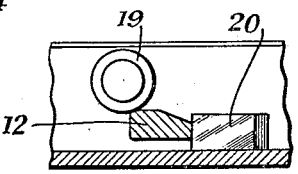
Figure 3 is a detail view, taken in the direction of the arrow 3 in Figure 2 showing the relative positions of the interengaging elements on the cap and coupling half when the cap is in position.
Figure 2:
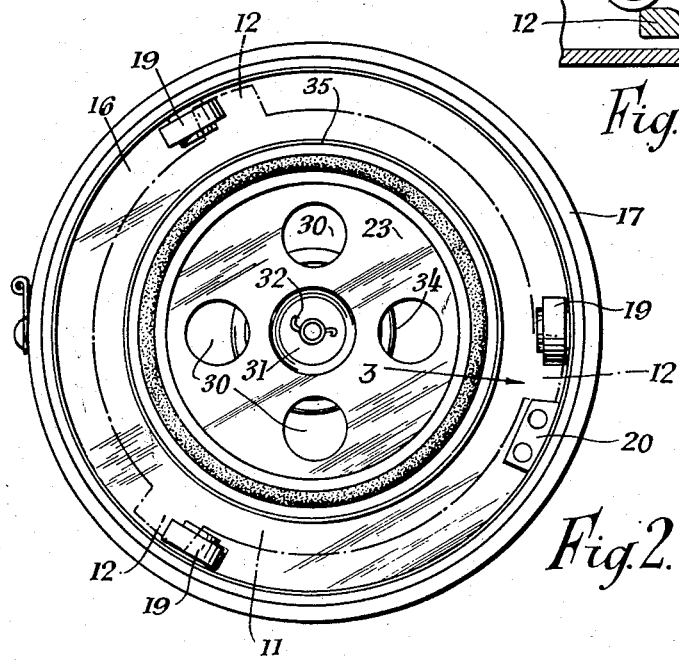
Figure 2 is a plan view of the closure device shown in Figure 1.

The closure device shown in the drawings comprises a cap 16 having a cylindrical wall 17 in which are mounted three inwardly projecting radial pins 18 carrying rollers 19 adapted to co-operate with the radial lugs 12 on the coupling part 10, a stop 20 being provided in the cap 16 in such a position that when the cap is fitted on the coupling part 10 and turned in a clockwise direction, the stop 20 engages one of the lugs 12 when the rollers 19 have passed across behind the lugs to positions in which their centres are slightly beyond the edges of the lugs, so that the cap 16 must be pushed inwardly before it can be turned in the opposite direction for removal. Figure 3 shows the stop 20, one lug 12, and one roller 19, as viewed in the direction of the arrow 3 in Figure 2, when the stop 20 is in engagement with the lug.

Attached to the centre of the cap 16, on its inner side is a capsule 21 comprising two rigid discs 22 and 23 each having a cylindrical rim, the rim 24 of the disc 22 which is nearest to the outer side of the cap fitting inside the rim 25 of the other disc 23, and carrying, in a circumferential groove 26, a resilient packing ring 27 of circular cross-section which engages with the surrounding rim 25 of the disc 23. The groove 26 is of greater width than the packing ring 27, so that the said ring can roll during relative axial movement of the discs. The inner disc 23 carries, on its exposed face, a resilient packing ring 28 of circular cross section which is retained in a groove 29 in the said disc, the radius of the packing ring 28 being smaller than the internal radius of the rim of that disc. The inner disc 23 is formed with a plurality of apertures 30 between its centre and the packing ring 28.

The packing ring 28 is retained in the groove 29 by deforming inwardly, at intervals, small portions of the edges of the groove.

A central pin 31, which is a press fit in the outer disc 22 of the capsule 21, passes through the centre of the inner disc 23, which is retained thereon, for limited axial movement, by a pin 32, and the outer end of the central pin 31 passes through the centre of the cap 16, its outer end being screw-threaded to receive a self-locking nut 33. A spring 34 located between the discs 22 and 23 acts to urge them apart. The radially outer surface 35 of the rim 25 of the inner disc 23 is tapered in both directions from a point substantially at the centre of its width as shown in Figure 1, its maximum radial dimension being such as to enter easily the sleeve-like portion 11 of the coupling part 10.

When the closure device is fitted to the coupling part, the capsule 21 enters the sleeve-like portion 11 of the latter, and, owing to its tapered surface 35, cannot bind therein, even if offered up at a substantial angle thereto. The packing ring 28 on the inner disc 23 of the capsule engages the internal shoulder 13 in the coupling part.

The cap 16 is then turned in a clockwise direction, the spring 34 being somewhat compressed as the rollers 19 pass behind the lugs 12 on the coupling part, so that when the roller centres pass beyond the said lugs the cap is urged slightly outwardly and thus locked against turning in the opposite direction. The spring 34 also urges the inner disc 23 of the capsule 21 towards the shoulder in the coupling part, ensuring a good seal thereon. If fluid leaks outwardly past the valve 15 of the coupling part and builds up pressure in the capsule 21, this pressure increases the thrust acting to seat the said capsule 21 on the shoulder, so that no leakage can take place even if a high pressure is built up in the capsule.

The fact that the capsule 21 rotates freely in the cap 16, and the fact that the packing ring 27 between the two discs 22 and 23 of the capsule can roll in its groove 26, ensure that there is practically no frictional resistance to either compression of the capsule or rotation of the cap, so that very little effort is needed to fit or remove it.

It will be understood that the capsule, instead of comprising two flanged discs the sliding joint between which is sealed by a packing ring, may be of the nature of a bellows, and that forms of interlocking means other than those described may be employed to hold the cap in position. Whilst the closure device has been described as applied to one half of a valved coupling device, it may be applied to any fluid supply connection.

The provision of the rollers 19 results in the interengaging means having very little friction, and the rolling motion of these rollers across the lugs makes for very smooth engagement and disengagement of the cap.

The positions of the studs and rollers could, of course, be interchanged, the lugs being provided on the cap and the rollers on the coupling part.

I claim:

1. For use in combination with a fluid supply connection having an annular seating surface and a plurality of radial projections, a closure device comprising a cap, a first disc on the inner side of said cap having an annular groove spaced from the edge thereof, a packing ring mounted in said groove to engage said seating surface, a second disc located between said first disc and said cap, means supporting said discs for rotary movement in said cap, a compression spring between said discs to urge them apart, overlapping cylindrical flanges on said discs, a packing ring supported on one of said flanges and engaging the other of said flanges to provide a fluid-tight joint between said discs, said first disc being formed with at least one aperture surrounded by the groove therein and defining the only communication into the space between said discs, radial projections on said cap to be engaged by relative turning movement of said cap and fluid supply connection with the radial projections on said connection and thereby prevent axial separation of said cap and said connection, and a stop on said cap to engage with one radial projection on said connection and limit said turning movement.

2. For use in combination with a fluid supply connection having an annular seating surface and a plurality of radially projecting lugs, a closure device comprising a cap, a first disc on the inner side of said cap having an annular groove spaced from the edge thereof, a packing ring mounted in said groove to engage said seating surface, a second disc located between said first disc and said cap, means supporting said discs for rotary movement in said cap, a compression spring between said discs to urge them apart, overlapping cylindrical flanges on said discs, a packing ring supported on one of said flanges and engaging the other of said flanges to provide a fluid-tight joint between said discs, said first disc being formed with at least one aperture surrounded by the groove therein and defining the only communication into the space between said discs, radially projecting pins on said cap, rollers mounted on said pins, to be engaged with said lugs by relative turning movement of said cap and connection to prevent axial separation of said cap and connection, and a stop on said cap to engage one of said lugs and thereby limit said turning movement, the circumferential spacing between the said stop and the axis of the roller co-operating with the same lug being greater than the width of the said lug by an amount less than the radius of the said rollers.

3. A closure device for a fluid supply connection having an annular seating surface and retaining means, said device comprising a cap having an end closure wall for removable mounting on a supply connection and having retaining means cooperative with the supply connection retaining means to prevent axial separation of said cap from the connection, and sealing means in said cap and including a pair of cup-shaped disks arranged substantially parallel to said cap end closure wall and having cylindrical flanges, said disks being rotatably mounted in said cap with their flanges extending in opposite directions and in slidable overlapping relationship and having limited axial movement relative to said cap, spring means between said disks and biasing said disks to the limit of their axial movement, a sealing element extending completely around and carried by one of said cylindrical flanges and slidably engaging the other of said flanges to form a fluid-tight joint permitting relative movement between said flanges and forming a substantially fluid-tight chamber within said disks, and an annular sealing member on the disk farthest from said cap closure wall and on the face thereof remote from said wall for engagement with the supply connection seating surface when said cap is mounted on the connection, said annular sealing member having a diameter smaller than that of the flange slidably engaged by said sealing element, said disk farthest from the cap closure wall having at least one opening within the boundary of said annular sealing member to provide the only communication with said chamber to pass pressure from the supply connection into said chamber and behind said latter disk to urge said annular sealing member against the seating surface.

References Cited in the file of this patent

UNITED STATES PATENTS

| Number | Name | Date |
|---|---|---|
| 1,738,893 | Grady | Dec. 10, 1929 |
| 2,102,962 | Ludington | Dec. 21, 1937 |
| 2,179,136 | Shoemaker | Nov. 7, 1939 |
| 2,225,964 | Bailey | Dec. 24, 1940 |
| 2,552,053 | Miller | May 8, 1951 |
| 2,581,537 | Maisch | Jan. 8, 1952 |

FOREIGN PATENTS

| Number | Country | Date |
|---|---|---|
| 733,195 | France | July 4, 1932 |